United States Patent [19]

Ng

[11] Patent Number: 5,731,832
[45] Date of Patent: Mar. 24, 1998

[54] APPARATUS AND METHOD FOR DETECTING MOTION IN A VIDEO SIGNAL

[75] Inventor: Hak-Leong Ng, Los Altos, Calif.

[73] Assignee: Prescient Systems, Menlo Park, Calif.

[21] Appl. No.: 743,991

[22] Filed: Nov. 5, 1996

[51] Int. Cl.[6] ................................................. H04N 7/18
[52] U.S. Cl. ................................... 348/155; 348/699
[58] Field of Search ................................ 348/156, 155, 348/699; H04N 7/18

[56] References Cited

U.S. PATENT DOCUMENTS

| | | | |
|---|---|---|---|
| 3,932,703 | 1/1976 | Bolsey | 348/155 |
| 4,160,998 | 7/1979 | Kamin | 348/155 |
| 4,408,224 | 10/1983 | Yoshida | 348/155 |
| 5,034,817 | 7/1991 | Everett | 348/155 |
| 5,103,254 | 4/1992 | Bell et al. | 396/147 |
| 5,581,297 | 12/1996 | Koz et al. | 348/152 |
| 5,602,585 | 2/1997 | Dickinson | 348/155 |

*Primary Examiner*—Howard W. Britton
*Attorney, Agent, or Firm*—Blakely Sokoloff Taylor & Zafman, LLP

[57] ABSTRACT

A system detects motion in a video signal by identifying differences between a current image frame and a reference image frame. A difference profile is calculated that represents the differences between the current image frame and the reference image frame. A motion detection signal is generated by the system if the difference profile exceeds a threshold. In one configuration, the system replaces the reference image frame with each successive current image frame. In other configurations, the system replaces the reference image frame with the current image frame if the difference profile exceeds the threshold. The system generates difference data associated with the differences between the current image frame and the reference image frame. This difference data can be partitioned into multiple blocks. An average value is calculated for each block of difference data. Upon generation of a motion detection signal, the system may be configured to record the current image frame if the difference profile exceeds the threshold.

28 Claims, 9 Drawing Sheets

| | | | | | | | | | |
|---|---|---|---|---|---|---|---|---|---|
| 2 | 2 | 2 | 1 | 1 | 1 | 2 | 2 | 2 | 2 |
| 3 | 2 | 1 | 2 | 1 | 1 | 1 | 2 | 2 | 2 |
| 2 | 2 | 1 | 1 | 1 | 1 | 1 | 2 | 3 | 2 |
| 2 | 2 | 1 | 2 | 2 | 1 | 1 | 1 | 2 | 1 |
| 2 | 2 | 1 | 1 | 1 | 1 | 1 | 1 | 2 | 2 |
| 2 | 2 | 2 | 2 | 2 | 1 | 2 | 2 | 1 | 1 |
| 2 | 2 | 2 | 1 | 2 | 2 | 1 | 2 | 2 | 2 |

FIG. 5B

| | | | | | | | | | |
|---|---|---|---|---|---|---|---|---|---|
| 55 | 51 | 50 | 53 | 52 | 52 | 52 | 53 | 57 | 55 |
| 52 | 49 | 51 | 50 | 49 | 50 | 52 | 52 | 55 | 57 |
| 51 | 50 | 52 | 49 | 48 | 48 | 50 | 52 | 54 | 58 |
| 51 | 50 | 52 | 49 | 48 | 48 | 51 | 52 | 54 | 57 |
| 54 | 50 | 51 | 52 | 50 | 50 | 52 | 52 | 56 | 54 |
| 56 | 54 | 52 | 52 | 52 | 53 | 52 | 56 | 60 | 51 |
| 49 | 50 | 54 | 58 | 59 | 60 | 58 | 56 | 54 | 44 |

| | | | | | | | | | |
|---|---|---|---|---|---|---|---|---|---|
| 03 | 03 | 03 | 02 | 03 | 03 | 03 | 03 | 03 | 03 |
| 04 | 03 | 03 | 04 | 03 | 03 | 03 | 03 | 04 | 04 |
| 04 | 03 | 03 | 05 | 04 | 03 | 03 | 02 | 04 | 04 |
| 05 | 03 | 05 | 05 | 03 | 03 | 03 | 03 | 03 | 04 |
| 04 | 63 | 65 | 31 | 08 | 02 | 02 | 02 | 03 | 03 |
| 04 | 86 | 81 | 74 | 91 | 04 | 03 | 03 | 03 | 03 |
| 05 | 31 | 46 | 50 | 40 | 11 | 05 | 04 | 04 | 04 |

APPARATUS AND METHOD FOR DETECTING MOTION IN A VIDEO SIGNAL

BACKGROUND OF THE INVENTION

1. Field of the Invention

The present invention relates to image processing systems. More specifically, the present invention relates to a system for detecting motion in an image represented by a video signal.

2. Background

Motion detection systems may be used to monitor a particular area or scene to determine whether motion has occurred in the area or scene. These motion detection systems may be used, for example, with security systems to detect intruders. Additionally, the motion detection systems can be utilized to monitor activity in an area or movement of objects or persons in an area.

Known systems used to detect motion within a particular area include infrared sensors for detecting changes in thermal or temperature patterns in the area. If an infrared sensor detects thermal changes, the sensor may activate an alarm or recording device based on the desired operation of the motion detection system. Since infrared sensors detect thermal changes, the sensors may not be effective at detecting motion of objects without a significant thermal pattern to detect. Additionally, infrared sensors are typically used to detect instantaneous motion; i.e., motion occurring relatively quickly from one moment to the next. Thus, infrared sensors are not well-suited for detecting slow changes in an area that occur over a period of time.

Furthermore, infrared sensors do not detect motion by analyzing information contained in a video signal. Instead, infrared sensors rely on changes in thermal patterns to detect motion and activate an alarm, recording device, or other system in response to the motion detection.

Other techniques for detecting motion in a particular area include using a video recording device to continuously capture images of the area being monitored. This system ensures that all motion and all changes in the particular area will be recorded, but may require significant storage capacity to store the continuous images. Although this system records all changes, the system also records images of the area when changes have not occurred. Therefore, the stored images must be scanned or analyzed at a later time to identify changes that occurred. This approach cannot provide an immediate response (e.g., triggering an alarm) upon detection of motion.

It is therefore desirable to provide a motion detection system capable of immediately identifying changes in an image represented by a video signal. Furthermore, it is desirable to provide a motion detection system capable of detecting changes in images with insignificant thermal patterns, and detecting changes that occur over a period of time.

SUMMARY OF THE INVENTION

The present invention provides a system for detecting motion in an image represented by a video signal. The invention is useful for detecting motion or monitoring environment changes based on changes in the image. The invention may be used to continuously monitor a particular scene and automatically trigger an alarm or activate a device if a significant change occurs in the scene. Additionally, the invention is capable of monitoring relatively slow changes over a period of time and recording images after a significant change has occurred.

An embodiment of the invention provides a system for detecting motion in a video signal by identifying differences between a current image frame and a reference image frame. A difference profile is calculated and represents the differences between the current image frame and the reference image frame. A motion detection signal is generated by the system if the difference profile exceeds a threshold.

In a particular embodiment of the invention, the system replaces the reference image frame with each successive current image frame.

Other embodiments of the invention replace the reference image frame with the current image frame if the difference profile exceeds the threshold.

Another aspect of the invention generates difference data associated with the differences between the current image frame and the reference image frame.

Other features of the invention partition the difference data into multiple blocks of data and calculate an average value associated with each block.

Another aspect of the invention calculates the difference profile by calculating a variance associated with the differences between the current image frame and the reference image frame.

Other embodiments of the invention include a mechanism to record the current image frame if the difference profile exceeds the threshold.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following derailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

Embodiments of the present invention provide a system for detecting motion in an image represented by a video signal. The invention is useful for detecting motion or monitoring environment changes based on changes in the image. For example, embodiments of the invention may be used to continuously monitor a particular scene and trigger an alarm or activate a device if a significant motion occurs in the scene. If, for example, the scene is a business office at a time when the office is closed and should be unoccupied, the detection of motion may indicate an intruder or other problem in the office. In this example, the invention ignores slow changes such as moving shadows caused by sunlight to reduce the possibility of false detections.

The invention may also be used to monitor relatively slow changes over a period of time. For example, the growth or changes of an object such as a plant or crystal may be monitored and recorded when the change in the object has reached a predefined threshold. Thus, the system may be used to take "snapshots" of the plant or crystal as it grows or changes. The time period between snapshots varies based on the rate of change and the detection threshold selected. The snapshots may be taken over a period of hours, days, weeks or longer depending on the object being monitored. Additional uses of the invention are discussed in the description that follows.

Figure 1:
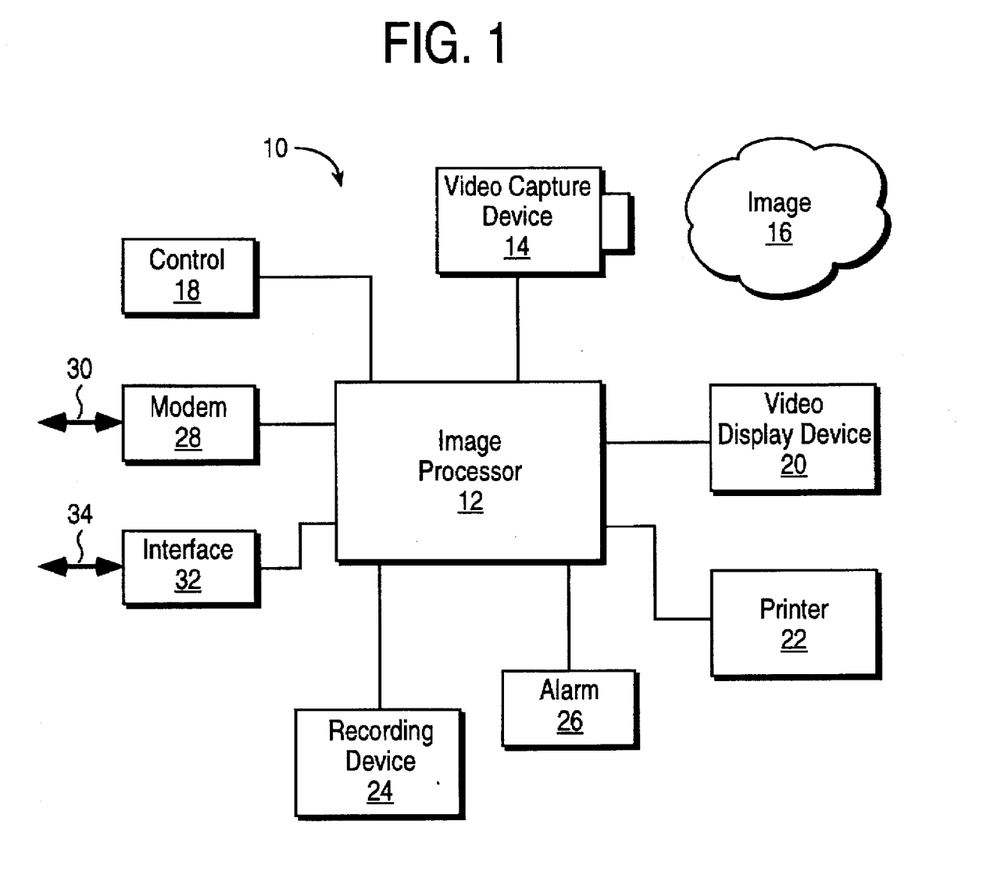
FIG. 1 illustrates an embodiment of an image processing system capable of implementing the teachings of the present invention.

FIG. 1 illustrates an embodiment of an image processing system capable of implementing the teachings of the present invention. Image processing system 10 includes an image processor 12 coupled to a video capture device 14. Embodiments of image processor 12 include hardware components, software programs, and other devices capable of processing images in accordance with the procedures discussed herein. Additional details regarding image processor 12 are provided below.

Video capture device 14 may be a camera or other device capable of capturing an image 16 and generating a video signal representing the captured image. Image 16 may represent, for example, an object, area, environment, or similar scene. Various attachments can be used with video capture device 14 to enhance or modify the manner in which image 16 is captured. For example, a telescopic lens attached to video capture device 14 enables the monitoring of an image at a significant distance from video capture device 14. Additionally, an adapter attached to video capture device 14 permits the capturing of images at night or under low-light conditions. In other embodiments of the invention, thermal images or radar images are captured by video capture device 14. Video capture device 14 then generates a video signal representing the captured thermal or radar image.

Video capture device 14 provides a video signal representing the captured image to image processor 12. Image processor 12 then performs various operations on the information provided in the video signal to detect motion and other changes in the image. Upon detection of motion or environment change, image processor 12 generates a motion detection signal. This motion detection signal may activate various alarms or other devices to indicate that motion or change is detected. For example, the motion detection signal may activate a recording device such as a disk drive or video tape recorder to record the captured image at the time motion is detected. In addition to recording the captured image, the recording device may record the time and date that the image is captured. The recording device can also record information such as temperature or other conditions present at the time the image is captured.

A control device 18 is coupled to image processor 12 and allows a user of the system to configure the image processor for the desired operation. For example, using control device 18, the user may specify the threshold level at which the image processor determines that motion has occurred. Additionally, control device 18 may be used to set the mode of operation of image processor 12 (e.g., detecting an intruder or monitoring slow environment changes over a period of time). A "threshold test mode" may be provided to allow the user to test the amount of motion or change required to generate a motion detection signal for various threshold settings. Additional details regarding the various modes of operation are discussed below.

A video display device 20 is coupled to image processor 12 and provides a visual display to the user of the system. Video display device 20 may display the current status of image processing system 10 as well as the mode of operation and other parameters or configured values. Additionally, video display device 20 may generate a particular pattern or warning symbol when motion is detected.

A printer 22 is also coupled to image processor 12 and provides a mechanism for the image processor to generate a hard-copy of its parameters, mode of operation, and other status information. Additionally, printer 22 may generate a printed log of all detected motion and detected changes in image 16. Recording device 24 is also coupled to image processor 12 and may record video image frames or other information processed or generated by image processor 12. Recording device 24 may include a video tape recorder, disk drive, or any other device capable of recording information in a non-volatile manner.

An alarm 26 is coupled to image processor 12 and provides a warning when motion or changes in image 16 are detected by image processor 12. Alarm 26 can be an audible alarm such as a siren or a visual alarm such as a flashing light. Additionally, alarm 26 may trigger other activities, such as contacting a police department, activating all lights within a building, or activating exterior lights around the perimeter of a building.

A modem 28 is coupled to image processor 12 and communication medium 30. Communication medium 30 may include a network, radio-frequency link, telephone line, or similar communication medium. Modem 28 is used to remotely monitor the status and operation of image processor 12, and may also be used to contact a police department, security service, or particular individuals or organizations in response to the detection of motion in image 16. For example, the detection of motion may automatically contact a local police department, a security service, or particular employees or managers of the building. The system is capable of generating a warning tone or other message for transmission across communication medium 30. Additionally, modem 28 can transmit the image captured at the time the motion was detected to a remote location. This permits the recipient of the captured image (on the other end of communication medium 30) to immediately view the event triggering the motion detection and respond accordingly.

An interface 32 is coupled to image processor 12 and a communication medium 34. Interface 32 provides additional connections with peripheral devices or networks. Communication medium 34 can be any type of communication medium, including those discussed above with respect to communication medium 30.

Various modes of operation are available and may be determined by the user or operator of the system. A first mode of operation is referred to as "motion detection mode." In this mode, the system detects differences between sequential image frames. This mode of operation works well for detecting significant movement or changes in the image between sequential frames. A reference image frame is updated with the previous captured frame each time a new image frame is captured. This mode of operation eliminates false motion detections caused by slow environment changes such as a moving shadow due to changes in the sunlight angle and other slow changes in light intensity.

A second mode of operation is referred to as "environment change mode." In this mode of operation, the reference image frame is only updated in response to an update signal generated by the user. Thus, the environment change mode detects changes in the current image as compared to a constant reference frame. For example, the reference frame may be an image that should not change, such as a museum exhibit. The environment change mode is used to compare the current captured image to the reference image. If a change exceeding the threshold is detected, an alarm is triggered. The alarm will remain activated until the reference image frame is changed or the alarm is otherwise deactivated by a user.

A third mode of operation is referred to as "adaptive environment change." In this mode of operation, the reference frame is updated after a motion detection signal is generated. Thus, the image processing system records an image frame after each significant change in the image. This mode is useful when monitoring crystal growth or plant growth by capturing a "snapshot" of the growth or changes at various stages. These changes in the image may occur over a period of time such as several hours, days, or weeks.

Figure 2:
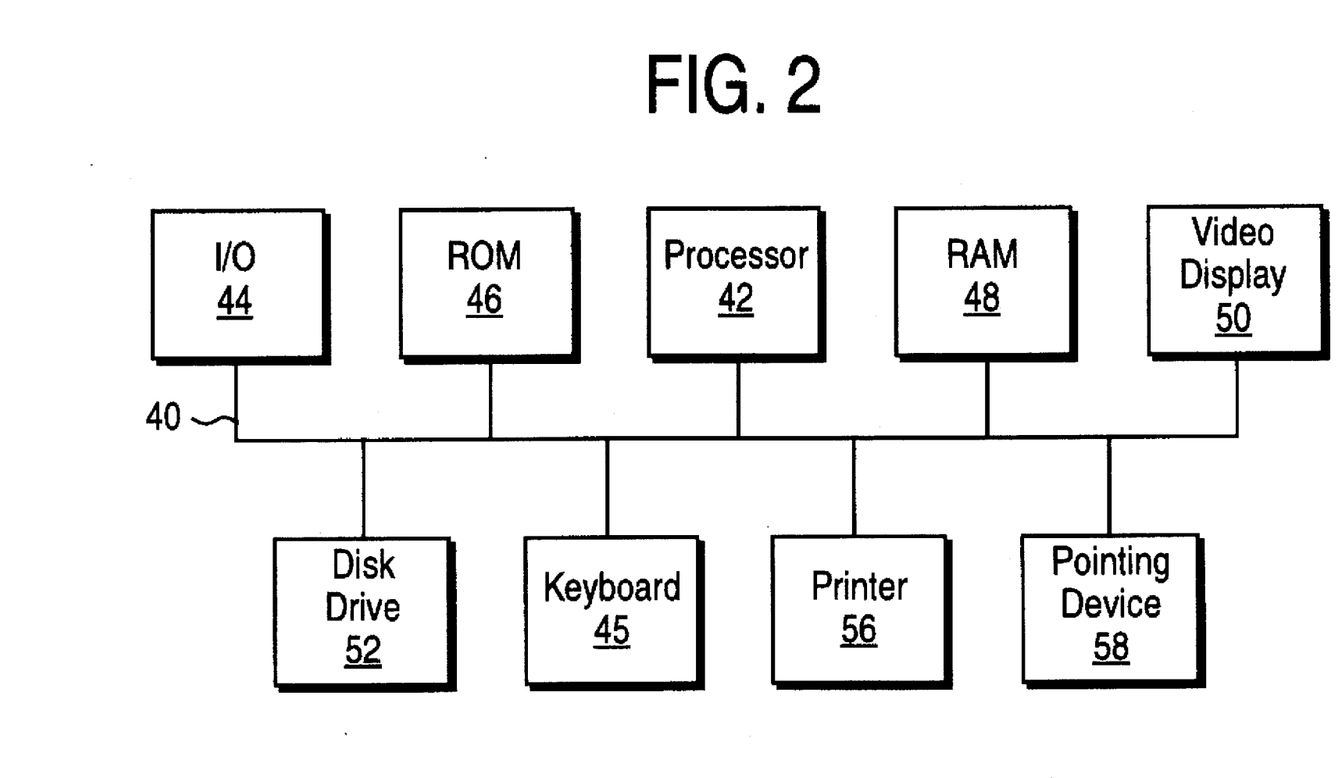
FIG. 2 illustrates a particular embodiment of a computer capable of operating as an image processor in accordance with the invention.

FIG. 2 illustrates a particular embodiment of a computer capable of operating as an image processor in accordance with the invention. The various components shown in FIG. 2 are provided by way of example. Certain components of the computer in FIG. 2 can be deleted from the image processing system for a particular implementation of the invention. The computer shown in FIG. 2 may be any type of computer including a general purpose computer.

FIG. 2 illustrates a system bus 40 to which various components are coupled. A processor 42 performs the processing tasks required by the computer. Processor 42 may be any type of processing device capable of implementing the steps necessary to perform the image processing procedures discussed below. An input/output (I/O) device 44 is coupled to bus 40 and provides a mechanism for communicating with other devices coupled to the computer. A read-only memory (ROM) 46 and a random access memory (RAM) 48 are coupled to bus 40 and provide a storage mechanism for various data and information used by the computer. Although ROM 46 and RAM 48 are shown coupled to bus 40, in alternate embodiments of the invention, ROM 46 and RAM 48 may be coupled directly to processor 42.

A video display 50 is coupled to bus 40 and displays various information and data to the user of the computer. A disk drive 52 is coupled to bus 40 and provides for the long-term mass storage of information. Disk drive 52 may be used to store various captured images and other data generated by the image processing system. A keyboard 54 and pointing device 58 are coupled to bus 40 and provide mechanisms for entering information and commands to the computer. A printer 56 is coupled to bus 40 and capable of creating a hard-copy of information generated or stored by the computer.

Figure 3:
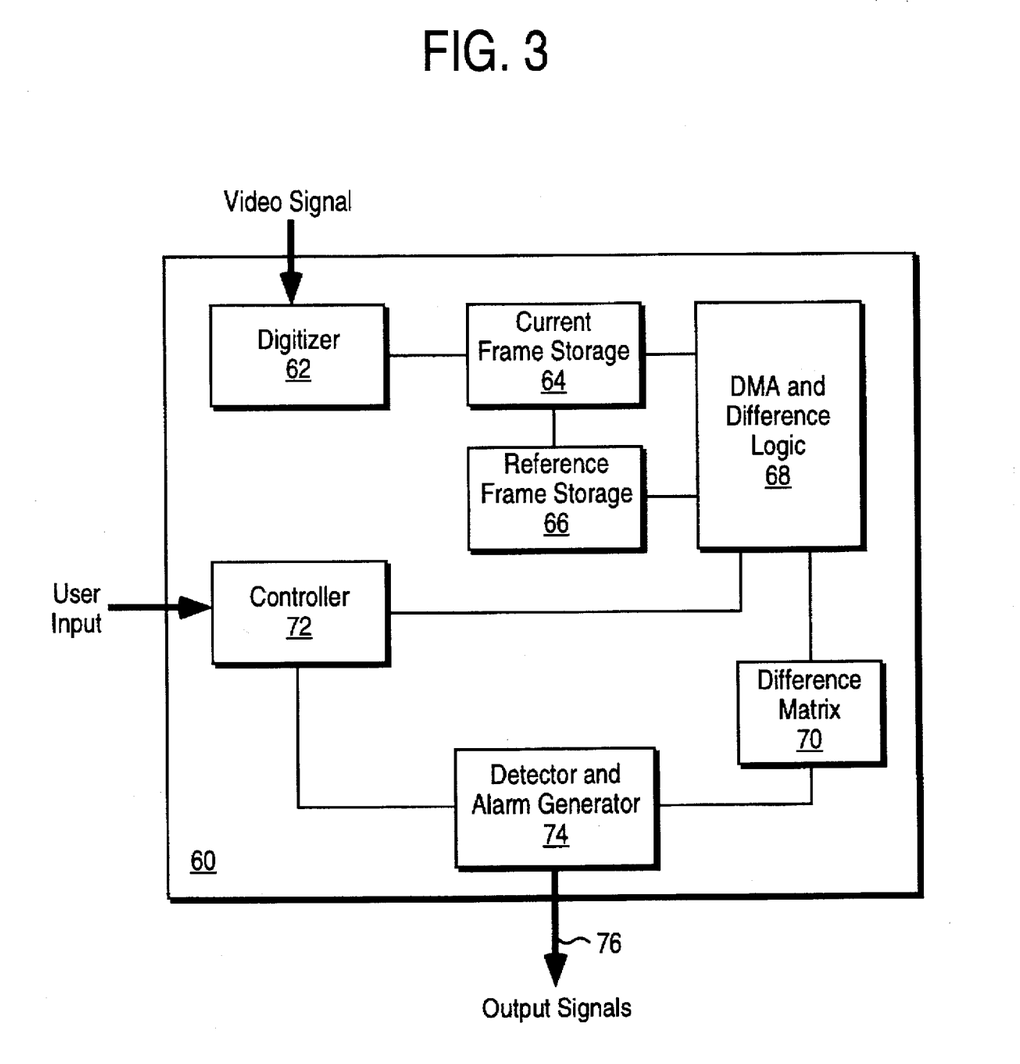
FIG. 3 illustrates an embodiment of an image processor.

FIG. 3 illustrates an embodiment of an image processor 60 capable of implementing the teachings of the present invention. Image processor 60 includes a digitizer 62 coupled to receive a video signal from a video capture device, such as video capture device 14 shown in FIG. 1. Digitizer 62 digitizes the incoming video signal into pixels for use by other portions of image processor 60. The incoming video signal may have a variety of signal formats, including National Television System Committee (NTSC) or Phase-Alteration Line (PAL). Digitizer 62 generates image frames containing pixel data and stores the current image frame in a current frame storage 64. Current frame storage 64 is typically a memory device such as a Random Access Memory (RAM).

In an embodiment of the invention, each pixel generated by digitizer 62 has a value in the range of 0–255. The pixel value indicates the luminance level (or brightness level) associated with the pixel. For example, a pixel value of 0 is black and a pixel value of 255 is bright. The values between 0 and 255 provide varying levels of brightness.

Current frame storage 64 is coupled to digitizer 62, a reference frame storage 66, and a direct memory access (DMA) and a difference logic circuit 68. Reference frame storage 66 is typically a memory device such as a RAM. DMA and difference logic circuit 68 is also coupled to reference frame storage 66 and is capable of comparing the image frames stored in current frame storage 64 and reference frame storage 66. The DMA circuitry is used to directly access and transfer the image frames stored in storage devices 64 and 66.

A difference matrix 70 is coupled to and receives signals from DMA and difference logic 68. Difference matrix 70 is also coupled to a detector 74 capable of generating a motion detection signal or alarm signal in response to detecting motion in the captured image. A controller 72 is coupled to detector 74 and DMA and difference logic 68. Controller 72 is capable of receiving input signals from a user to control various image processing parameters and configurations such as threshold values, mode of operation, types of alarms (or devices to activate upon detecting motion), and the duration of the monitoring procedure.

Detector 74 receives signals from controller 72 and difference matrix 70. In response to those signals, detector 74 determines whether motion has occurred in the current image frame. Detector 74 is capable of generating various output signals on communication medium 76. These output signals may be used to activate an alarm or recording device, contact a security service, or perform other functions in response to detection of motion in the image.

The various components illustrated in FIG. 3 may be separated as shown, or combined together into fewer components. For example, current frame storage 64 and reference frame storage 66 may be combined together in a single device. Additionally, controller 72 and detector 74 may be combined in a single component. In a particular embodiment of the invention, the components shown in FIG. 3 are provided in a single device specifically designed for processing information contained in video signals. In other embodiments, various components illustrated in FIG. 3 may be implemented in an image processing system using software algorithms. Thus, the components contained in image processor 60 may be emulated in a general purpose computer of the type illustrated in FIG. 2.

Figure 4A:
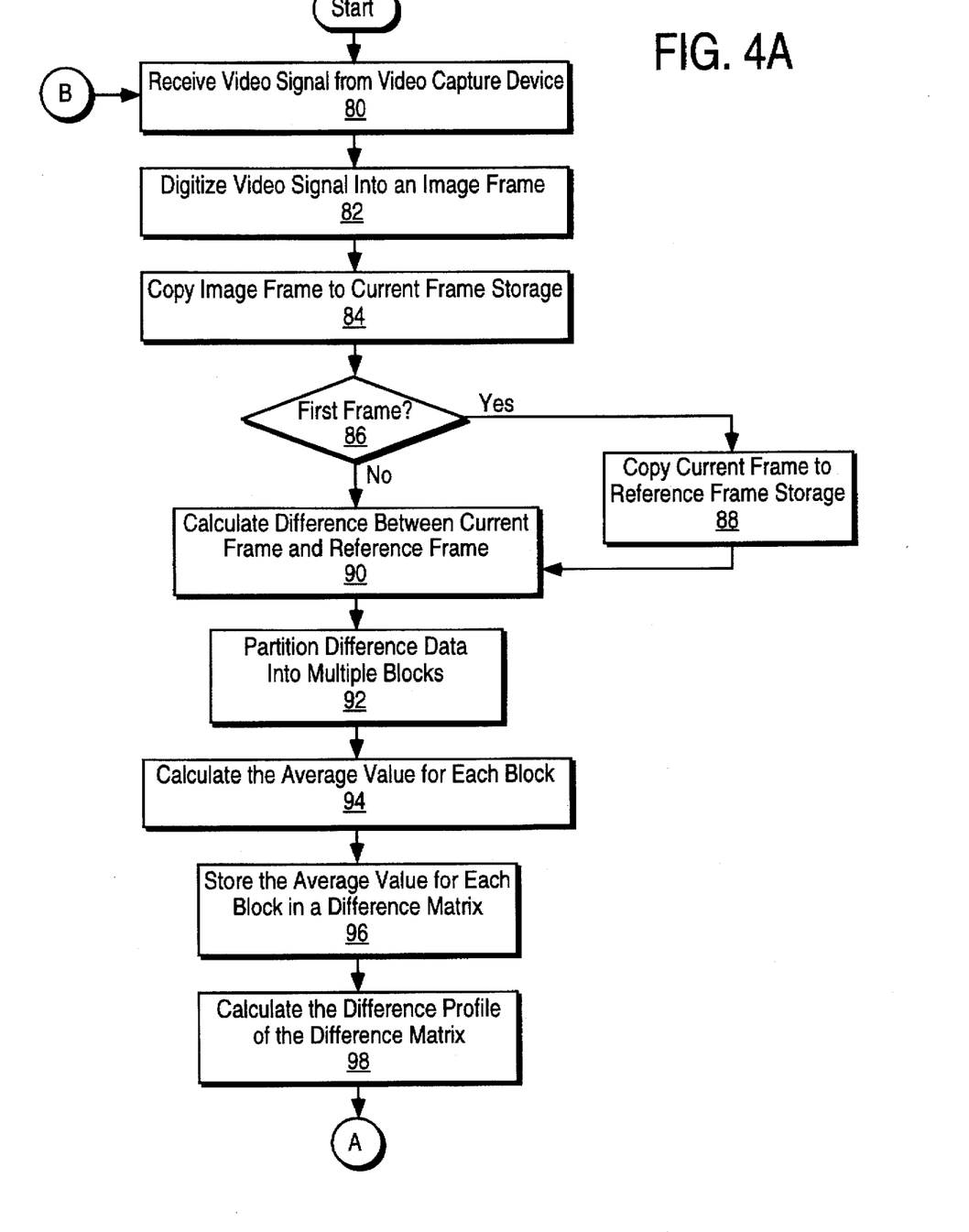
FIGS. 4A and 4B are flow diagrams illustrating an embodiment of a procedure for detecting motion in an image.
Figure 4B:
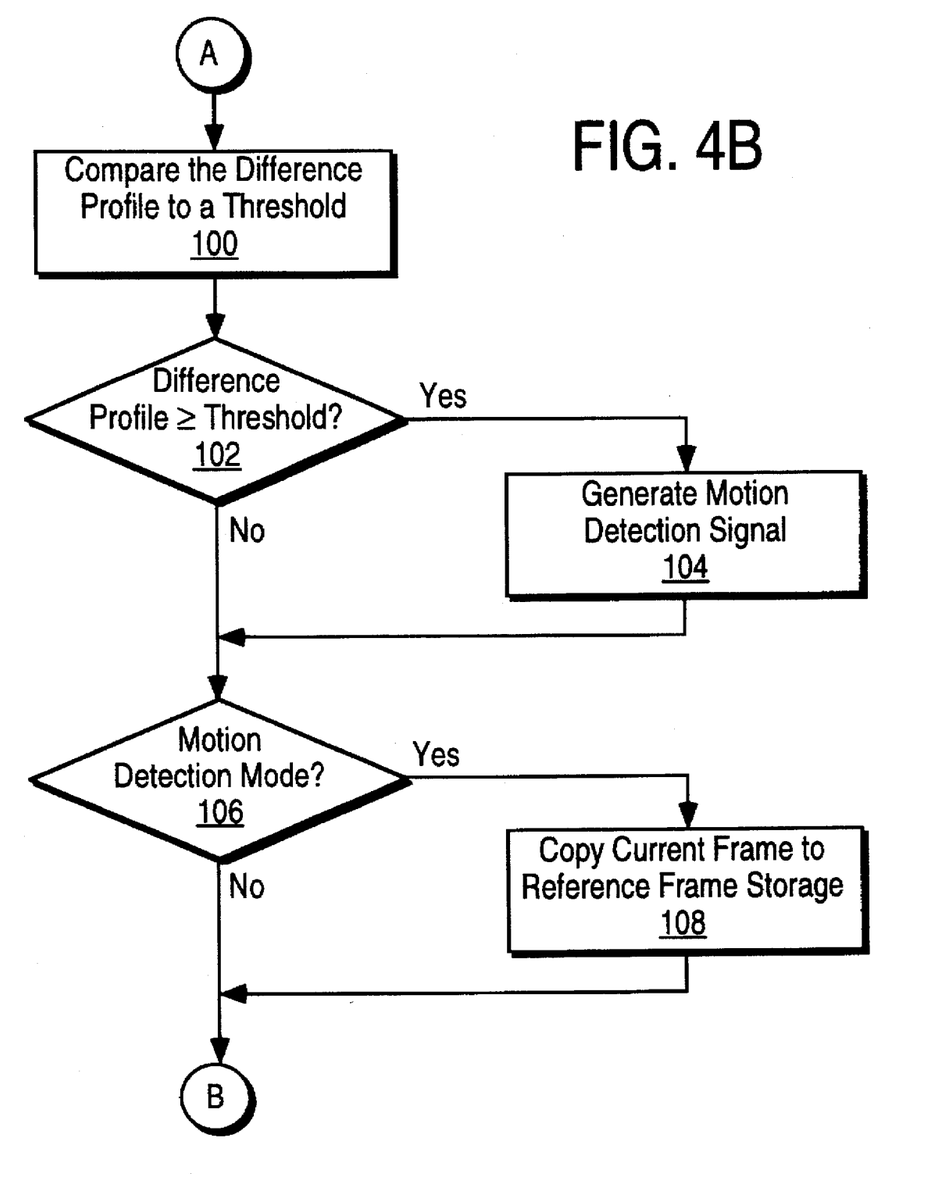

FIGS. 4A and 4B are flow diagrams illustrating an embodiment of a procedure for detecting motion in an image. The procedure illustrated in FIGS. 4A and 4B may be implemented using an image processor of the type shown in FIG. 3. At step 80, a video signal is received from a video capture device, such as a camera. Step 82 digitizes the video signal into an image frame. The image frame is then copied to the current frame storage at step 84. Step 86 determines whether the image frame is the first frame captured by the image processor. If the current frame is the first frame, then the procedure branches to step 88 where the current frame is copied to the reference frame storage. The procedure then continues to step 90 where the image processor calculates the difference between the current frame and the reference frame. If the current frame was not the first frame at step 86, then the procedure continues directly to step 90.

When calculating the difference between the current frame and the reference frame, step 90 generates difference data indicating the differences between the two frames. This difference data is determined on a pixel-by-pixel basis. As discussed above, each pixel may have a value between 0 and 255 indicating a luminance (or brightness) associated with the pixel. To determine the difference between a particular pair of pixels, the pixel value in the current frame is subtracted from the corresponding pixel value in the reference frame. The difference data is represented as the magnitude (or absolute value) of the difference in pixel values. Therefore, the order of subtraction is not important; i.e., subtracting the current image from the reference image generates the same difference data as subtracting the reference frame from the current frame. The comparison of pixels in the current image with corresponding pixels in the reference image continues until the differences between all pixels have been determined.

At step 92, the procedure partitions the difference data into multiple blocks. For example, the difference data may be partitioned into multiple 16×16 pixel blocks. At step 94, the average value for each block of pixels is calculated. In a particular embodiment of the invention, the average value may be calculated using the following formula:

$$\bar{x} = \frac{\sum_{i=1}^{n} |x_i|}{n}$$

The above formula calculates the absolute mean for each block of difference data. The absolute mean is used to prevent differences having negative values from canceling differences having positive values. For example, if negative difference values and positive difference values cancel one another, a particular block may have significant changes, but the mean may be insignificant (e.g., close to zero).

In the above formula, n is the number of data entries (e.g., pixel values) in the block being analyzed. For example, using blocks having 16×66 pixels, each block contains 256 data entries. The variable $x_i$ represents each individual pixel entry in a particular block within the difference data.

Application of the absolute mean formula is illustrated, by example, in Table 1 below. For purposes of illustration, Table 1 represents a 4×4 pixel block.

TABLE 1

| 3 | 3 | 0  | 0  |
|---|---|----|----|
| 2 | 2 | 0  | -2 |
| 2 | 0 | -2 | -3 |
| 0 | 0 | -1 | -2 |

In the example of Table 1, significant changes are identified in the upper-left portion of the block and in the lower-right portion of the block. However, since certain difference values are positive and other values are negative, the average value of all 16 entries is only 0.125 (the sum of the 16 entries divided by 16). Thus, the negative difference values significantly reduce the average value associated with the block shown in Table 1.

However, using the absolute mean formula illustrated above, the absolute mean for the entries in Table 1 is 1.375 (the sum of the absolute value of the 16 entries divided by 16).

After calculating the average value for each block in step 94, the procedure continues to step 96 where the average value for each block is stored in a difference matrix. Thus, the difference matrix represents the average of the difference data between the current frame and the reference frame.

At step 98, the procedure calculates a difference profile from the difference matrix. The difference profile is used to identify differences between the current frame and the reference frame, but compensates for substantially uniform changes in the image such as changes in light level. The difference profile provides a single value representing the overall differences in the difference matrix. In an embodiment of the invention, the difference profile is calculated as the variance of the values stored in the difference matrix. The variance of the difference matrix may be calculated using the following formula:

$$\text{Variance} = \frac{\sum_{i=1}^{n} (x_i - \bar{x})^2}{n}$$

The variables used in the variance formula are the same as those discussed above with respect to the absolute mean formula. Although an embodiment of the invention is illustrated using the variance to calculate the difference profile, those of ordinary skill in the art will appreciate that the difference profile may be calculated using other calculations such as a standard deviation or other procedures that identify the differences among the values in the difference matrix.

Referring to FIG. 4B, the procedure for detecting motion in an image continues from step 98 in FIG. 4A to step 100 in FIG. 4B. Step 100 compares the difference profile calculated in step 98 to a threshold. The threshold may be determined by the user or operator of the image processing system to determine the level of motion or change required to trigger a motion detection signal. If the difference profile equals or exceeds the threshold value at step 102, then the procedure branches to step 104 where a motion detection signal is generated. This motion detection signal may activate an alarm or other warning system. Additionally, the motion detection signal may activate a recording device or other device in response to the motion detection.

At step 106, the procedure determines whether the image processing system is operating in "motion detection mode." As discussed above, in motion detection mode, a reference image frame is updated with the previous captured frame each time a new image frame is captured. If motion detection mode is selected, then step 106 branches to step 108 where the current frame is copied to the reference frame storage, thereby replacing the previous reference frame. The procedure then returns to step 80 in FIG. 4A to receive the next image frame and repeat the image processing procedure. If motion detection mode is not being used, then the procedure branches from step 106 back to step 80 in FIG. 4A without changing the reference frame.

In an alternate embodiment of the invention, the difference data calculated at step 90 is not partitioned into multiple blocks at step 92. Instead, the difference data calculated at step 90 is the difference matrix. Therefore, steps 92, 94, and 96 are not required in this embodiment. The difference profile is calculated at step 98 using the difference data stored in the difference matrix. Since the difference data was not partitioned into blocks and averaged, the difference matrix contains significantly more data entries.

Figure 5A:
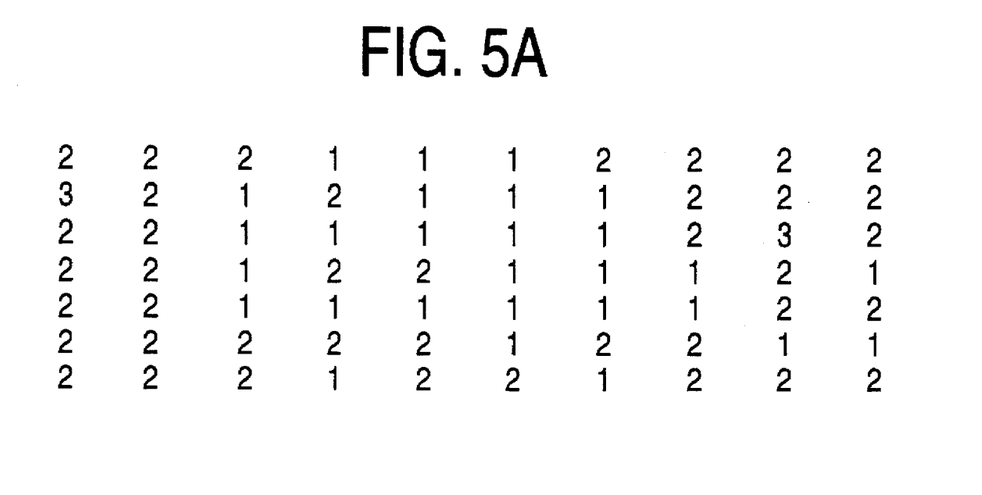
FIGS. 5A and 5B illustrate example difference matrices for various pairs of image flames.
Figure 5B:
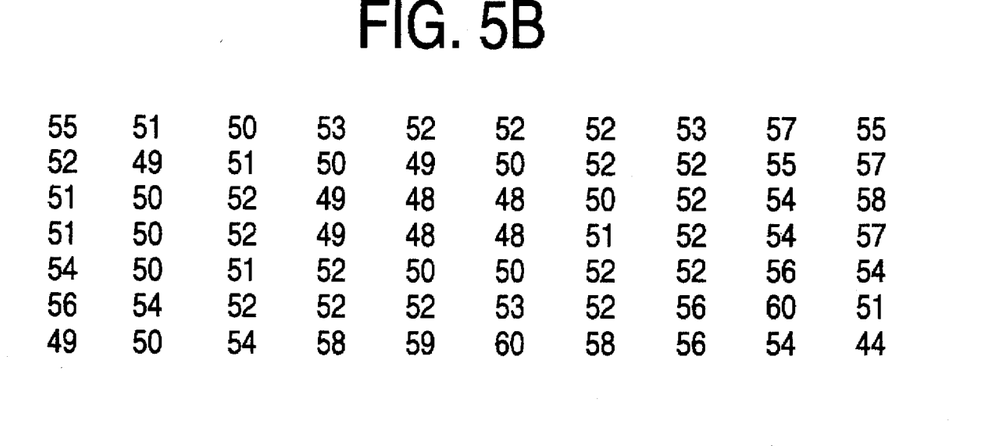

FIGS. 5A and 5B illustrate example difference matrices for various pairs of image flames. FIG. 5A is an example difference matrix generated from a pair of image flames having minimal differences and similar light levels. The values shown in FIG. 5A represent the absolute mean of the pixel values for each corresponding block of pixels. The overall mean of the values shown in FIG. 5A is 1 (truncated to the nearest integer) and the variance (the difference profile in this example) is 0.69. Since the variance is small, the changes identified in FIG. 5A are not likely to trigger a motion detection signal unless the threshold is very small, i.e., less than the variance.

FIG. 5B is an example difference matrix generated for a pair of image frames having no significant differences other than a change in light level between the frames. In this example, the overall mean of the values shown in FIG. 5B is 52 (truncated) and the variance is 10.03. Although the overall mean is significantly higher than the example in FIG. 5A, the variance remains relatively small. If, for example, the threshold is 15, then the differences illustrated in FIG. 5B will not trigger a motion detection signal.

Figure 6A:
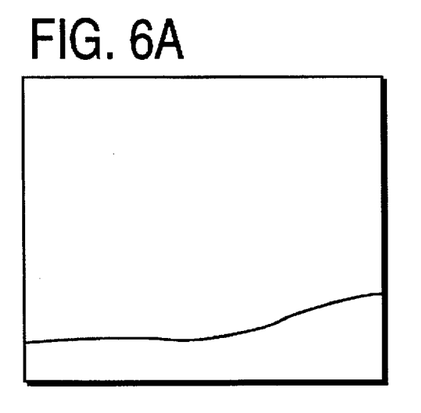
FIGS. 6A and 6B illustrate example image flames captured by an image processing system.
Figure 6B:
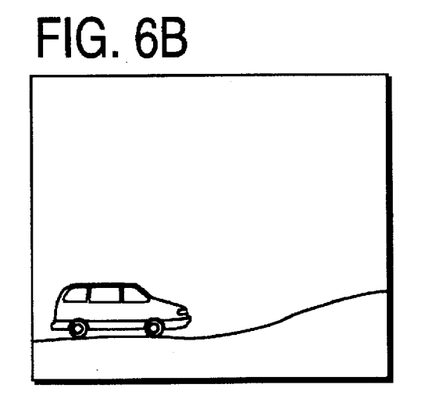

FIGS. 6A and 6B illustrate example image flames captured by an image processing system. For purposes of explanation, FIG. 6A will be referred to as the reference frame and FIG. 6B will be referred to as the current frame. The flames shown in FIGS. 6A and 6B may be sequential frames (e.g., motion detection mode), or may be separated by a period of time (e.g., environment change mode or adaptive environment change mode). For example, in motion detection mode, the frames are sequential because each successive current frame replaces the previous reference frame. In environment change mode or adaptive environment change mode, the two frames may be separated by a period of time. For example, the reference frame may be taken when no vehicles are in the area and is not replaced by successive frames.

Figure 6C:
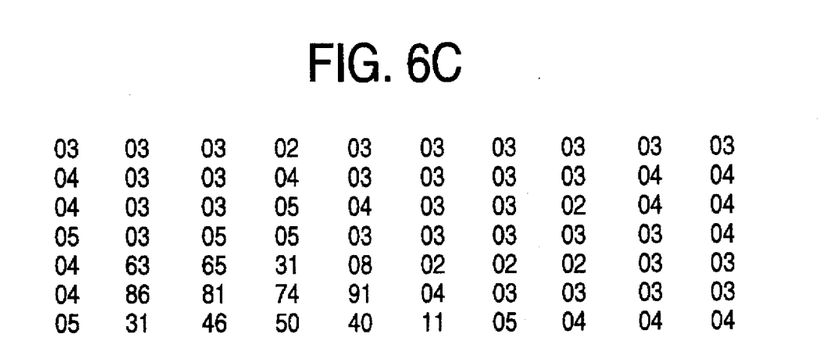
FIG. 6C illustrates an example difference matrix for the image frames shown in FIGS. 6A and 6B.
Figure 7A:
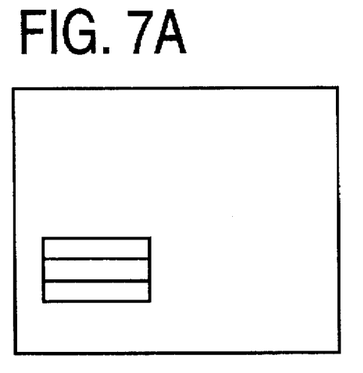
FIGS. 7A-7F illustrate example image flames captured by an image processing system.
Figure 7B:
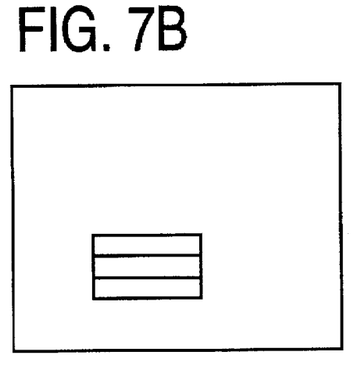
Figure 7C:
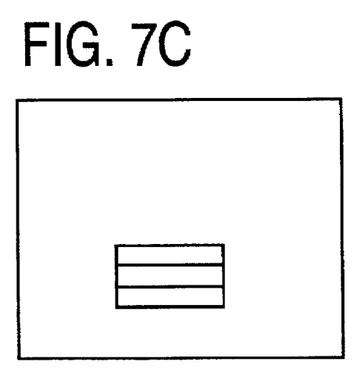
Figure 7D:
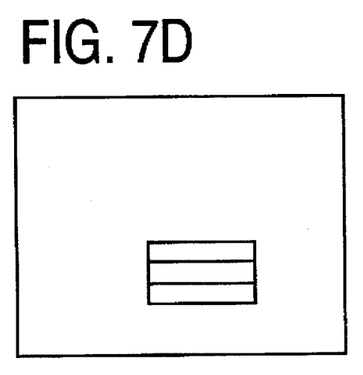
Figure 7E:
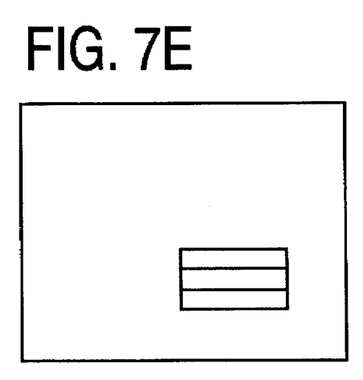
Figure 7F:
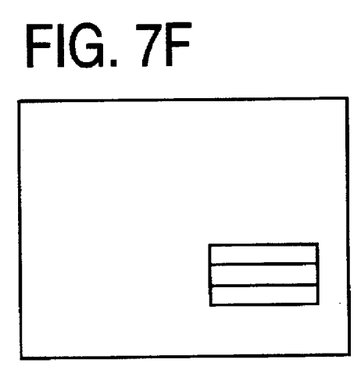

Regardless of the mode of operation, a difference matrix (FIG. 6C) is generated for the two frames shown in FIGS. 6A and 6B. The difference matrix in FIG. 6C illustrates significant differences in the portion of the image in which the vehicle appeared. In this difference matrix, the overall mean is 12 (truncated) and the variance is 487.5. If, for example, the threshold is set to 15, then the variance exceeds the threshold and will trigger the generation of a motion detection signal.

Based on the mode of operation, the reference frame (FIG. 6A) may be replaced by the current frame (FIG. 6B). If the system is operating in motion detection mode, then the reference frame is replaced with the current image. If a motion detection signal is generated and the system is operating in adaptive environment change mode, then the reference frame is replaced with the current image. If the system is operating in environment change mode, then the reference frame is not replaced unless the user of the system specifically instructs the system to replace the reference frame with the current frame.

FIGS. 7A–7F illustrate example image frames captured by an image processing system operating, for example, in the adaptive environment change mode. Thus, the reference frame is replaced with the current frame each time the threshold is reached or exceeded. The images shown in FIGS. 7A–7F illustrate an object moving from left to right across the monitored scene. If the object shown in FIGS. 7A–7F is moving slowly, the images may be captured over a significant period of time. If the threshold remains constant for all images in FIGS. 7A–7F, then the movement of the object from one image to the next is substantially constant. Thus, although the object may be moving at different speeds as it crosses the monitored scene, the images are captured based on changes in the image, not based on elapsed time. For example, the object may be moving quickly in image frames 7A–7C such that the three images are captured over a period of a few seconds. However, movement of the object may slow such that image frames 7D–7F are captured over a period of several minutes. Thus, although the object's speed may change, the relative difference between adjacent image frames is approximately constant.

As illustrated with respect to FIGS. 7A–7F, the adaptive environment change mode is particularly useful in capturing changes in an image that occur slowly. This mode of operation provides substantially constant changes between successive image frames. If the system is monitoring changes that do not occur uniformly, such as plant growth or crystal growth, the adaptive environment change mode captures images based on the level of differences between the images. Therefore, when a plant or crystal is growing or changing slowly, the elapsed time between captured images is large. But, when the plant or crystal is growing or changing quickly, the elapsed time between captured images is small. As discussed above, the change required to trigger generation of a motion detection signal is determined by the threshold. A small threshold produces more captured images with smaller changes between successive images. A large threshold produces fewer captured images with larger changes between successive images.

Figure 8:
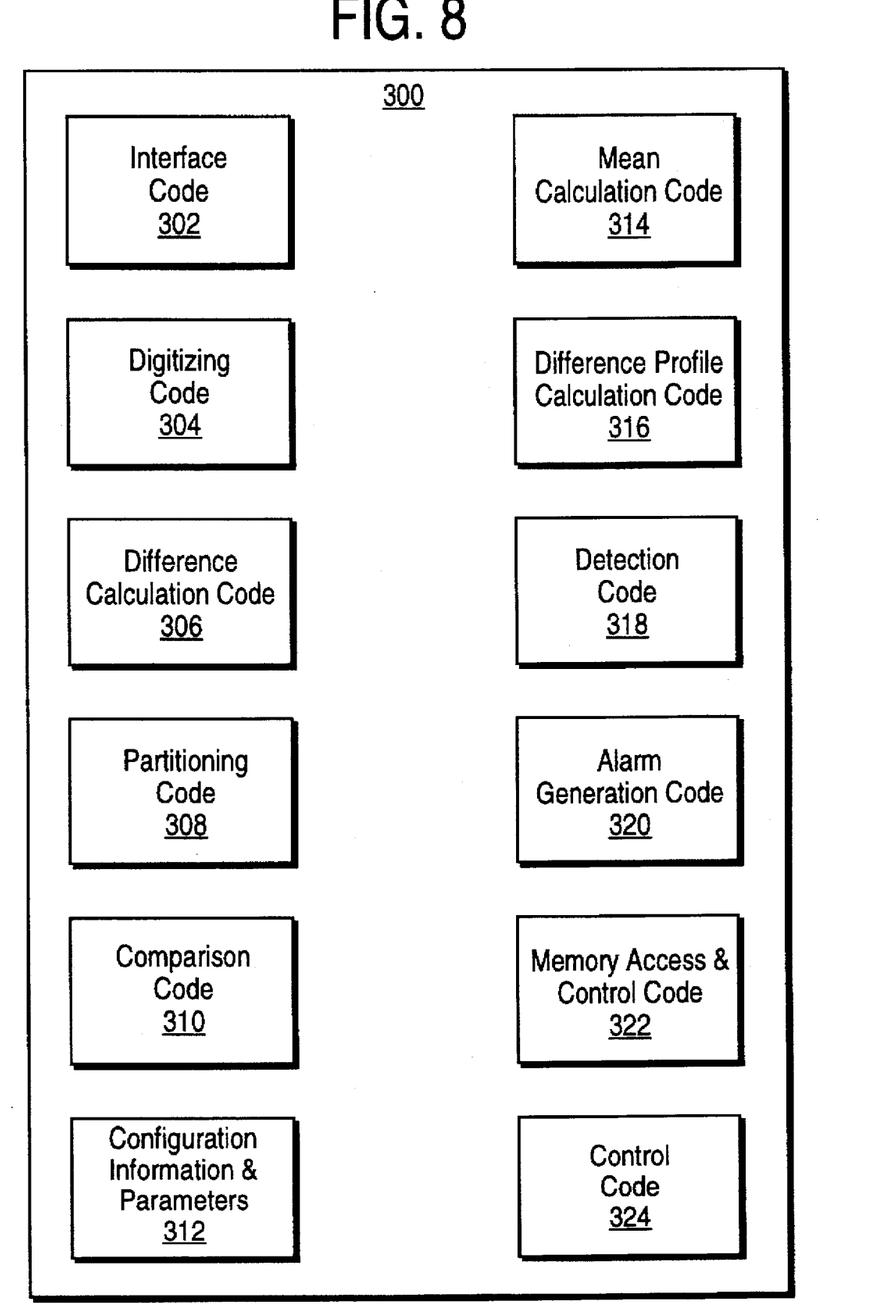
FIG. 8 illustrates an embodiment of a computer-readable medium containing various sets of instructions, code sequences, configuration information, and other data.

FIG. 8 illustrates an embodiment of a computer-readable medium 300 containing various sets of instructions, code sequences, configuration information, and other data used by a computer or other processing device. The embodiment illustrated in FIG. 8 is suitable for use with the image processing system described above with respect to FIGS. 3, 4A, and 4B. The various information stored on medium 300 is used to perform various image processing operations. Computer-readable medium 300 may also be referred to as a processor-readable medium. Computer-readable medium 300 may be any type of magnetic, optical, or electrical storage medium including a diskette, CD-ROM, memory device, or similar storage medium.

Computer-readable medium 300 includes interface code 302 that controls the flow of information between a processor and devices external to the system. For example, interface code 302 is capable of controlling interfaces to cameras, alarms, recording devices, networks, and similar devices and systems. Digitizing code 304 is used to convert video signals into digital pixel data. Difference calculation code 306 identifies differences between image frames after the frames are digitized by digitizing code 304. Partitioning code 308 divides the difference data into multiple blocks or partitions. Comparison code 310 compares various quantities or variables, such as comparing a difference profile to a threshold value.

Computer-readable medium 300 also includes configuration information and parameters 312. This information can be provided by the user of the system and may include the system's mode of operation, threshold values, and similar data. Mean calculation code 314 calculates the mean value for a particular set of numbers or data. Difference profile calculation code 316 calculates the difference profile for a set of numbers or data. Detection code 318 considers variables and other parameters to determine whether to generate a motion detection signal. Alarm generation code 320 is capable of generating an alarm signal in response to a motion detection signal. Memory access and control code 322 monitors and controls access to various memory devices, including memory devices storing image frames. Control code 324 controls the overall operation of the image processing system, including the flow of information between the various portions of the system.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method for detecting motion in a video signal, the method comprising the steps of:

identifying differences between a current image frame and a reference image frame;

calculating a difference profile representing the differences between the current image frame and the reference image frame; and generating a motion detection signal if the difference profile exceeds a threshold.

2. The method of claim 1 further including the step of replacing the reference image frame with the current image frame.

3. The method of claim 1 further including the step of replacing the reference image frame with the current image frame if the difference profile exceeds the threshold.

4. The method of claim 1 further including the step of generating difference data associated with the differences between the current image frame and the reference image frame.

5. The method of claim 4 further including the steps of partitioning the difference data into a plurality of blocks and calculating an average value associated with each block.

6. The method of claim 5 further including the step of generating a difference matrix containing the average value associated with each block.

7. The method of claim 4 further including the step of generating a difference matrix, the difference matrix containing average values calculated from the difference data.

8. The method of claim 1 wherein the step of generating a motion detection signal further includes recording the current image frame if the difference profile exceeds the threshold.

9. The method of claim 1 wherein the step of calculating a difference profile includes calculating a variance associated with the differences between the current image frame and the reference image frame.

10. A motion detector comprising:

a digitizer coupled to receive a video signal and generate a current image frame;

a storage device coupled to the digitizer and configured to store the current image frame and a reference image frame;

a first circuit coupled to the storage device and configured to identify differences between the current image frame and the reference image frame; and a second circuit coupled to the first circuit and configured to generate a motion detection signal if a difference profile representing the differences identified by the first circuit exceeds a threshold.

11. The motion detector of claim 10 wherein the first circuit further includes a direct memory access (DMA) controller.

12. The motion detector of claim 11 wherein the DMA controller controls access to the current image frame and the reference image frame.

13. The motion detector of claim 10 wherein the first circuit includes a mechanism for generating a difference matrix representing the differences between the current image frame and the reference image frame.

14. The motion detector of claim 10 further including a recording device configured to record the current image frame if the difference profile exceeds the threshold.

15. The motion detector of claim 10 wherein the difference profile is determined by calculating a variance associated with the differences between the current image frame and the reference image frame.

16. A computer software product including a medium readable by a processor, the medium having stored thereon:

a first sequence of instructions which, when executed by the processor, causes the processor to identify differences between a current image frame and a reference image frame;

a second sequence of instructions which, when executed by the processor, causes the processor to calculate a difference profile representing the differences between the current image frame and the reference image frame; and a third sequence of instructions which, when executed by the processor, causes the processor to generate a motion detection signal if the difference profile exceeds a threshold.

17. The computer software product of claim 16 further including a fourth sequence of instructions which, when executed by the processor, causes the processor to replace the reference image frame with the current image frame.

18. The computer software product of claim 17 further including a fifth sequence of instructions which, when executed by the processor, causes the processor to replace the reference image frame with the current image frame if the difference profile exceeds the threshold.

19. The computer software product of claim 16 further including a fourth sequence of instructions which, when executed by the processor, causes the processor to generate difference data associated with the differences between the current image frame and the reference image frame.

20. The computer software product of claim 19 further including a fifth sequence of instructions which, when executed by the processor, causes the processor to partition the difference data into a plurality of blocks and calculate an average value associated with each block.

21. The computer software product of claim 16 further including a fourth sequence of instructions which, when executed by the processor, causes the processor to record the current image frame if the difference profile exceeds the threshold.

22. The computer software product of claim 16 wherein the second sequence of instructions calculates the difference profile by determining a variance associated with the differences between the current image frame and the reference image frame.

23. A motion detector comprising:

means for identifying differences between a current image frame and a reference image frame;

means for calculating a difference profile representing the differences between the current image frame and the reference image frame; and means for generating a motion detection signal if the difference profile exceeds a threshold.

24. The motion detector of claim 23 further including means for replacing the reference image frame with the current image frame.

25. The motion detector of claim 23 further including means for generating difference data associated with the differences between the current image frame and the reference image frame.

26. The motion detector of claim 25 further including means for partitioning the difference data into a plurality of blocks and calculating an average value associated with each block.

27. The motion detector of claim 25 further including means for generating a difference matrix, the difference matrix containing average values calculated from the difference data.

28. The motion detector of claim 23 wherein the means for calculating a difference profile include means for calculating a variance associated with the differences between the current image frame and the reference image frame.

* * * * *